United States Patent
Mitsuru et al.

(10) Patent No.: US 9,228,060 B2
(45) Date of Patent: Jan. 5, 2016

(54) METHOD FOR MANUFACTURING SULFONATED AROMATIC POLYMER

(71) Applicant: KONISHI CHEMICAL IND. CO., LTD., Wakayama (JP)

(72) Inventors: Tomonori Mitsuru, Wakayama (JP); Yoshinori Itani, Wakayama (JP); Wakako Sakata, Wakayama (JP)

(73) Assignee: KONISHI CHEMICAL IND. CO., LTD., Wakayama (JP)

( * ) Notice: Subject to any disclaimer, the term of this patent is extended or adjusted under 35 U.S.C. 154(b) by 0 days.

(21) Appl. No.: 14/361,071

(22) PCT Filed: Dec. 18, 2012

(86) PCT No.: PCT/JP2012/082746
§ 371 (c)(1),
(2) Date: May 28, 2014

(87) PCT Pub. No.: WO2013/094586
PCT Pub. Date: Jun. 27, 2013

(65) Prior Publication Data
US 2014/0350197 A1    Nov. 27, 2014

(30) Foreign Application Priority Data

Dec. 22, 2011  (JP) .................. 2011-281103

(51) Int. Cl.
| | | |
|---|---|---|
| *C08G 75/23* | (2006.01) | |
| *C08G 75/20* | (2006.01) | |
| *C08G 85/00* | (2006.01) | |
| *C08F 8/36* | (2006.01) | |

(52) U.S. Cl.
CPC . *C08G 75/23* (2013.01); *C08F 8/36* (2013.01); *C08G 75/20* (2013.01); *C08G 85/00* (2013.01); *C08G 85/004* (2013.01)

(58) Field of Classification Search
USPC ....................................... 525/535
See application file for complete search history.

(56) References Cited

U.S. PATENT DOCUMENTS

| | | | |
|---|---|---|---|
| 4,413,106 A | | 11/1983 | Coplan et al. |
| 5,028,337 A | * | 7/1991 | Linder et al. ............. 210/642 |
| 5,596,128 A | * | 1/1997 | Ogata et al. ............... 562/95 |
| 7,754,844 B2 | * | 7/2010 | Sakaguchi et al. ......... 528/171 |
| 2003/0105173 A1 | * | 6/2003 | Sugaya et al. ............. 521/27 |
| 2005/0064260 A1 | * | 3/2005 | Otsuki et al. ............. 429/30 |
| 2006/0073610 A1 | * | 4/2006 | Kopaciewicz ............. 436/518 |
| 2008/0063917 A1 | * | 3/2008 | Yamashita et al. ......... 429/33 |
| 2011/0065190 A1 | * | 3/2011 | Nakano et al. ............ 435/377 |

FOREIGN PATENT DOCUMENTS

| | | |
|---|---|---|
| IT | 1295299 | 10/1997 |
| JP | 48-92342 | 11/1973 |
| JP | 51-15029 | 5/1976 |
| JP | 59-196322 | 11/1984 |
| JP | 2-208322 | 8/1990 |
| JP | 2001-261818 | 9/2001 |
| JP | 2004-244437 | 9/2004 |
| JP | 2006-179448 | 7/2006 |
| JP | 2007-42561 | 2/2007 |
| JP | 2008-19413 | 1/2008 |
| WO | 92/06935 | 4/1992 |

OTHER PUBLICATIONS

Machine Translation of JP 2008-019413.*
International Search Report issued Apr. 16, 2013 in International (PCT) Application No. PCT/JP2012/082746.

* cited by examiner

*Primary Examiner* — Mike M Dollinger
(74) *Attorney, Agent, or Firm* — Wenderoth, Lind & Ponack, L.L.P.

(57) ABSTRACT

An object of the present invention is to provide a method for industrially advantageously manufacturing a sulfonated aromatic polymer while preventing a reduction in the molecular weight of the resulting sulfonated aromatic polymer. The present invention relates to a method for manufacturing a sulfonated aromatic polymer, comprising sulfonating an aromatic polymer and a sulfonating agent in the presence of a solvent of a compound containing a sulfonyl group ($-SO_2-$).

3 Claims, No Drawings

METHOD FOR MANUFACTURING SULFONATED AROMATIC POLYMER

TECHNICAL FIELD

The present invention relates to a method for manufacturing a sulfonated aromatic polymer.

BACKGROUND ART

Polymers having an anionic group in a molecule are effective as functional polymers such as ion exchange resins and solid acid catalysts. Of these, polymers having a sulfonic acid group are particularly widely used because they have excellent properties due to the high dissociability of sulfonic acid group. Of these, sulfonated products of polyether sulfone (sulfonated polyether sulfone) and derivatives thereof are effective materials for forming thin films used in a variety of separation processes such as reverse osmosis, ultrafiltration, and ion exchange. Sulfonated polymers such as sulfonated polyether sulfone and sulfonated polysulfone have recently been reported to be effective as solid polymer electrolytes for fuel cells. A method for efficiently producing such sulfonated products has been desired.

Known examples of the method for producing sulfonated polyether sulfone (hereinafter sometimes referred to as "S-PES") include a method for performing sulfonation in a chlorinated hydrocarbon solvent such as 1,2-dichloroethane, methylene chloride, and chloroform (for example, see PTL 1 and PTL 2), and a method for performing sulfonation using sulfuric acid as a solvent (for example, see PTL 3 and PTL 4).

Unfortunately, the method using chlorinated hydrocarbon as a solvent is difficult to industrialize because the molecular weight of a resulting S-PES is reduced, and a reaction product adheres to the walls of a reactor and mixing blades, making it difficult to remove the reaction product from the reactor. Chlorinated hydrocarbon has other problems such as severe toxicity and strict environmental regulations. The method using sulfuric acid as a solvent has a problem regarding significant reduction in the molecular weight of the resulting S-PES.

CITATION LIST

Patent Literature

PTL 1: JP59-196322A
PTL 2: JP2001-261818A
PTL 3: JPH02-208322A
PTL 4: JP2007-42561A

SUMMARY OF INVENTION

Technical Problem

An object of the present invention is to provide a method for industrially advantageously manufacturing a sulfonated aromatic polymer while preventing a reduction in the molecular weight of the resulting sulfonated aromatic polymer.

Solution to Problem

The present inventors conducted extensive research in light of the above situation. Consequently, they found that by sulfonating an aromatic polymer using a compound containing a sulfonyl group ($-SO_2-$) such as sulfolane as a solvent, a reduction in the molecular weight of the product (sulfonated aromatic polymer) can be prevented, and a situation wherein a reaction product solidifies and is difficult to remove from a reactor can be prevented. The present invention was accomplished as a result of further research.

The present invention provides methods for manufacturing a sulfonated aromatic polymer shown below.

Item 1. A method for manufacturing a sulfonated aromatic polymer, comprising sulfonating an aromatic polymer and a sulfonating agent in the presence of a solvent of a compound containing a sulfonyl group ($-SO_2-$).
Item 2. The method according to Item 1, wherein the solvent is at least one member selected from the group consisting of sulfolane and dimethylsulfone.
Item 3. The method according to Item 1 or 2, wherein the aromatic polymer is at least one member selected from the group consisting of aromatic polyamides, aromatic polyimides, aromatic polyether ketones (PEKs), aromatic polyether ether ketones (PEEKs), aromatic polycarbonates, aromatic polysulfones (PSs), aromatic polysulfoxides, aromatic polysulfides, aromatic polyether sulfones (PESs), aromatic polyether ether sulfones, aromatic polyesters, and polystyrenes.
Item 4. The method according to Item 3, wherein the aromatic polymer is an aromatic polyether sulfone (PES).
Item 5. The method according to any one of Items 1 to 4, wherein the sulfonating agent is at least one member selected from the group consisting of chlorosulfonic acid, sulfuric anhydride, sulfuric acid, fuming sulfuric acid, and polyalkylbenzene sulfonic acids.

Advantageous Effects of Invention

According to the method of the present invention, a reduction in the molecular weight of a product can be prevented, which makes it possible to prevent a reduction in the strength of the product. Further, in the present invention, sulfonation reaction proceeds in the state where an aromatic polymer is dissolved or dispersed in a solvent, preventing the adhesion of a reaction product to mixing blades and the walls of a reactor. Thus, the present invention is easily industrialized.

DESCRIPTION OF EMBODIMENTS

The present invention relates to a method for manufacturing a sulfonated aromatic polymer wherein an aromatic polymer and a sulfonating agent are sulfonated in the presence of a solvent, i.e., a compound containing a sulfonyl group ($-SO_2-$).

The aromatic polymer used as a starting material is not limited as long as the polymer has, in the main chain or side chain(s), an aromatic skeleton, which can be sulfonated, and the polymer can be dissolved or dispersed in a solvent. The molecular weight etc. of the aromatic polymer is not particularly limited. Examples of the aromatic polymer having an aromatic skeleton in the main chain include aromatic polyamides, aromatic polyimides, aromatic polyether ketones (PEKs), aromatic polyether ether ketones (PEEKs), aromatic polycarbonates, aromatic polysulfones (PSs), aromatic polysulfoxides, aromatic polysulfides, aromatic polyether sulfones (PESs), aromatic polyether ether sulfones, aromatic polyesters, etc. Examples of the aromatic polymer having an aromatic skeleton in the side chain(s) include polystyrenes; and copolymers containing styrene, such as styrene-butadiene copolymer and acrylonitrile-styrene copolymer, etc. Such aromatic polymers can be used singly, or in combination of two or more. Of these, aromatic polyether sulfones (PESs), aromatic polyether ether ketones (PEEKs), aromatic polysulfones (PSs), etc., are preferable, and aromatic polyether sulfones (PESs) are particularly preferable.

The aromatic polymer is first added to a solvent and fully stirred. Thus, the aromatic polymer is dissolved or dispersed.

The main feature of the present invention is to use a compound containing a sulfonyl group ($-SO_2-$) as a solvent. By performing sulfonation reaction in the compound containing a sulfonyl group ($-SO_2-$), the sulfonation reaction proceeds in the state where the aromatic polymer is dissolved or dispersed in a solvent, preventing the adhesion of a reaction product to mixing blades and the walls of a reactor. In a method for performing sulfonation using sulfuric acid as a solvent, the molecular weight of the product (sulfonated aromatic polymer) is reduced (see Comparative Example 1 below) compared to the molecular weight of the starting material (aromatic polymer), while in the present invention, the molecular weight of the product is not reduced because the compound containing a sulfonyl group ($-SO_2-$) is used as a solvent, thus preventing a reduction in the strength of the product.

Examples of the compound containing a sulfonyl group ($-SO_2-$), which is used as a solvent, include cyclic sulfone compounds such as sulfolane; dialkylsulfones such as dimethylsulfone and dibutylsulfone; etc. As the solvent used in the present invention, a solvent having little affect on a sulfonating agent may be added to a compound containing a sulfonyl group ($-SO_2-$). Examples of the solvent having little affect on a sulfonating agent include halogenated hydrocarbons such as 1,2-dichloroethane and methylene chloride; aliphatic hydrocarbons such as hexane and heptane; etc. The amount of the solvent used may be an amount capable of keeping a state wherein the aromatic polymer, which is a starting material, is dissolved or dispersed. To induce uniform sulfonation reaction, it is preferable that a solution in which the aromatic polymer is dissolved in the solvent or a dispersion in which the aromatic polymer is dispersed in the solvent have a concentration in a degree such that rapid stirring can be performed when a sulfonating agent is added in a subsequent step. The specific amount of the solvent used is preferably 0.1 to 100 parts by weight, and more preferably 1 to 50 parts by weight per part by weight of the aromatic polymer. When the solvent is a mixed solvent of a compound containing a sulfonyl group ($-SO_2-$) and another solvent, the compound containing a sulfonyl group ($-SO_2-$) is preferably contained in an amount of 10 parts by weight or more, more preferably 50 parts by weight or more per 100 parts by weight of the solvent.

Subsequently, the solution or dispersion of the resulting aromatic polymer is mixed with a sulfonating agent and stirred at a determined temperature for a determined time to perform sulfonation reaction.

The sulfonating agent to be used is not particularly limited as long as the sulfonating agent can introduce a sulfonic acid group ($-SO_3H$). Example thereof include chlorosulfonic acid, sulfuric anhydride, sulfuric acid, fuming sulfuric acid, polyalkylbenzene sulfonic acids (e.g., 1,3,5-trimethylbenzene-2-sulfonic acid, 1,2,4,5-tetramethylbenzene-3-sulfonic acid, and 1,2,3,4,5-pentamethylbenzene-6-sulfonic acid); etc. Of these, chlorosulfonic acid is preferable.

As the amount of the sulfonating agent to be added is high, the degree of sulfonation of the aromatic polymer is increased, and ion exchange capacity of the resulting sulfonated product is increased. Conversely, as the amount of the sulfonating agent is low, the sulfonation degree is reduced.

The proportion of the sulfonating agent to be used is not particularly limited. It is preferably 0.01 to 100 mol, and more preferably 0.1 to 30 mol per mol of a repeating unit of an aromatic polymer (e.g., PES: [$-C_6H_4-SO_2-C_6H_4-O-$] and PEEK: [$-C_6H_4-CO-C_6H_4-O-C_6H_4-O-$]).

The sulfonating agent can be introduced into a solution or dispersion of the aromatic polymer by an arbitrary method. For example, it is preferable to supply the sulfonating agent in a gaseous or liquid form.

The reaction time and reaction temperature of sulfonation also affect the degree of sulfonation. As the reaction temperature or reaction time is increased, the degree of sulfonation is increased. The reaction temperature in the present invention is generally 0 to 200° C., and preferably 10 to 150° C. The reaction time is generally 0.1 to 100 hours, and preferably 1 to 30 hours.

After the completion of reaction, a product may be isolated by a known method. For example, a reaction liquid is added dropwise to water to precipitate a product, thereby isolating the product. The temperature of water to be used may be a reaction temperature or lower. By adding the reaction liquid dropwise to water, sulfonation reaction can be slowed or stopped, and the sulfonating agent is reacted with water and decomposed to completely stop sulfonation reaction. The amount of water is preferably such that the product in the reaction liquid is immediately solidified and the temperature of water is not rapidly increased. By thus adding the reaction liquid dropwise to water, a sulfonated product, which is a desired product, is generally precipitated as a white precipitate (grainy slurry). The resulting precipitate may be separated by filtration, washed with water, and dried according to a common procedure.

The sulfonated aromatic polymer of the present invention can be produced according to the above method; however, the mixing sequence of the aromatic polymer, solvent, and sulfonating agent is not particularly limited to the sequence mentioned above. For example, the aromatic polymer may be mixed with the solvent, and then the solution or dispersion of the aromatic polymer may be added to the sulfonating agent, or the aromatic polymer and the sulfonating agent may be separately added to the solvent.

The sulfonated aromatic polymer obtained by the method above is effective as a permselective film used for reverse osmosis filtration, ultrafiltration, and the like, ion exchange resin, etc. Further, the sulfonated aromatic polymer can be used in a solid acid catalyst, solid polymer electrolyte for fuel cells, conductive polymer, etc.

EXAMPLES

The present invention is explained in detail below with reference to the Examples of the present invention; however, the present invention is not limited thereto.

A product was dissolved in DMF, and ion exchange capacity is measured using an automatic titrator (produced by Hiranuma, TS-980). The weight average molecular weight (Mw) is determined by GPC (gel permeation chromatography), using HLC-8320GPC from Tosoh Corp. utilizing polystyrene standard.

Example 1

Sulfolane (60 g) was added to a flask equipped with a stirrer, and PES (Mw 90,000) (10.6 g) (46 mmol/unit) was added thereto, followed by stirring at 70° C. After the PES was completely dissolved in the sulfolane, chlorosulfonic acid (4.7 g, 40 mmol) was added thereto dropwise over 20 minutes. The mixture was heated to 100° C., and kept at 100° C. for 10 hours. Thereafter, the reaction product was added dropwise to ion exchange water (1 L), and the resulting white, grainy slurry was filtered. The slurry was washed using ion exchange water and filtered repeatedly until the filtrate had a pH of 5.0 or more. Subsequently, the slurry was dried using a vacuum dryer at a temperature of 90° C., pressure of 7 kPa or less for 24 hours, thereby obtaining S-PES (ion exchange capacity: 0.67 meq/g, Mw 126,000).

Example 2

Sulfolane (60 g) was added to a flask equipped with a stirrer, and PES (Mw 120,000) (10.6 g) (46 mmol/unit) was added thereto, followed by stirring at 70° C. After the PES was completely dissolved in the sulfolane, chlorosulfonic acid (15.6 g, 133 mmol) was added thereto dropwise over 20 minutes. The mixture was heated to 100° C., and kept at 100° C. for 10 hours. Thereafter, the reaction product was added dropwise to ion exchange water (1 L), and the resulting white, grainy slurry was filtered. The slurry was washed using ion exchange water and filtered repeatedly until the filtrate had a pH of 5.0 or more. Subsequently, the slurry was dried using a vacuum dryer at a temperature of 90° C., pressure of 7 kPa or less for 24 hours, thereby obtaining S-PES (ion exchange capacity: 1.81 meq/g, Mw 131,000).

Example 3

Sulfolane (60 g) was added to a flask equipped with a stirrer, and PES (Mw 90,000) (10.6 g) (46 mmol/unit) was added thereto, followed by stirring at 70° C. After the PES was completely dissolved in the sulfolane, sulfuric acid (23.5 g, 240 mmol) was added thereto dropwise over 20 minutes. The mixture was heated to 100° C., and kept at 100° C. for 24 hours. Thereafter, the reaction product was added dropwise to ion exchange water (1 L), and the resulting white, grainy slurry was filtered. The slurry was washed using ion exchange water and filtered repeatedly until the filtrate had a pH of 5.0 or more. Subsequently, the slurry was dried using a vacuum dryer at a temperature of 90° C., pressure of 7 kPa or less for 24 hours, thereby obtaining S-PES (ion exchange capacity: 0.03 meq/g, Mw 97,000).

Example 4

Sulfolane (60 g) was added to a flask equipped with a stirrer, and PES (Mw 90,000) (10.6 g) (46 mmol/unit) was added thereto, followed by stirring at 40° C. After the PES was completely dissolved in the sulfolane, sulfuric anhydride (9.3 g, 116 mmol) was added thereto dropwise over 20 minutes. The mixture was kept at 40° C. for 6 hours. Thereafter, the reaction product was added dropwise to ion exchange water (1 L), and the resulting white, grainy slurry was filtered. The slurry was washed using ion exchange water and filtered repeatedly until the filtrate had a pH of 5.0 or more. Subsequently, the slurry was dried using a vacuum dryer at a temperature of 90° C., pressure of 7 kPa or less for 24 hours, thereby obtaining S-PES (ion exchange capacity: 0.64 meq/g, Mw 142,000).

Example 5

Dimethylsulfone (77 g) was added to a flask equipped with a stirrer, and PES (Mw 90,000) (5.2 g) (22.4 mmol/unit) was added thereto, followed by stirring at 120° C. The PES was not completely dissolved in the dimethyl sulfone, and was in a dispersion state. Chlorosulfonic acid (7.8 g, 67 mmol) was added dropwise to the dispersion over 20 minutes. The mixture was kept at 120° C. for 8 hours. Thereafter, the reaction product was added dropwise to ion exchange water (1 L), and the resulting white, grainy slurry was filtered. The slurry was washed using ion exchange water and filtered repeatedly until the filtrate had a pH of 5.0 or more. Subsequently, the slurry was dried using a vacuum dryer at a temperature of 90° C., pressure of 7 kPa or less for 24 hours, thereby obtaining S-PES (ion exchange capacity: 0.63 meq/g, Mw 120,000).

Example 6

Sulfolane (60 g) was added to a flask equipped with a stirrer, and polyphenylsulfone (PFS) (Mw 57,000) (5.0 g) (23 mmol/unit) was added thereto, followed by stirring at 70° C. The PFS was not completely dissolved in the sulfolane, and was in a dispersion state. Chlorosulfonic acid (8 g, 69 mmol) was added dropwise to the dispersion over 20 minutes. The mixture was heated to 100° C., and kept at 100° C. for 4 hours. Thereafter, the reaction product was added dropwise to ion exchange water (1 L), and the resulting white, grainy slurry was filtered. The slurry was washed using ion exchange water and filtered repeatedly until the filtrate had a pH of 5.0 or more. Subsequently, the slurry was dried using a vacuum dryer at a temperature of 90° C., pressure of 7 kPa or less for 24 hours, thereby obtaining sulfonated polyphenylsulfone (ion exchange capacity: 1.8 meq/g, Mw 190,000).

Comparative Example 1

Sulfuric acid (330 g) was added to a flask equipped with a stirrer, and PES (Mw 90,000) (30 g) (129 mmol/unit) was added thereto, followed by stirring overnight, thereby completely dissolving the PES in the sulfuric acid. 28% Fuming sulfuric acid (45 g, 146 mmol in terms of $SO_3$) was added dropwise to the sulfuric acid solution containing PES over 20 minutes. The mixture was heated to 60° C., and kept at 60° C. for 5.5 hours. Thereafter, the reaction product was added dropwise to ion exchange water (1 L), and the resulting white, grainy slurry was filtered. The slurry was washed using ion exchange water and filtered repeatedly until the filtrate had a pH of 5.0 or more. Subsequently, the slurry was dried using a vacuum dryer at a temperature of 90° C., pressure of 7 kPa or less for 24 hours, thereby obtaining S-PES (ion exchange capacity: 0.84 meq/g, Mw 8,800).

Comparative Example 2

Chloroform (8700 g) was added to a flask equipped with a stirrer, and PES (Mw 90,000) (714 g) (3.1 mol/unit) was added thereto, followed by stirring overnight. The PES was not completely dissolved in the chloroform. Chlorosulfonic acid (412 g, 3.5 mmol) was added dropwise to the inhomogeneous mixture over one hour. The mixture was heated to 60° C., and kept at 60° C. for six hours. Six hours later, the reaction product turned into paste, and adhered to mixing blades and the walls of a reaction container. Thus, the reaction product could not be removed from the flask.

Comparative Example 3

Methylene chloride (60 g) was added to a flask equipped with a stirrer, and PES (Mw 90,000) (10.6 g) (46 mol/unit) was added thereto, followed by stirring overnight. The PES was not completely dissolved in the methylene chloride. Chlorosulfonic acid (4.7 g, 40 mmol) was added dropwise to the inhomogeneous mixture over one hour. The mixture was heated to 40° C., and kept at 40° C. for eight hours. Eight hours later, the reaction product turned into paste, and adhered to mixing blades and the walls of a reaction container. Thus, the reaction product could not be removed from the flask.

Comparative Example 4

DMSO (60 g) was added to a flask equipped with a stirrer, PES (Mw 90,000) (10.6 g) (46 mmol/unit) was added thereto, and the PES was completely dissolved in the DMSO at 70° C. Chlorosulfonic acid (4.7 g, 40 mmol) was added dropwise to the DMSO solution containing PES over 20 minutes. A solid was precipitated in the middle of dropwise addition, and rotation of the solid cake was started in the reaction liquid. The solid adhered to the walls of the reaction container and thermometer. At the same time, since a very bad smell occurred, the reaction was stopped. The bad smell presumably occurred because DMSO was decomposed in the chlorosulfonic acid.

The invention claimed is:

1. A method for manufacturing a sulfonated aromatic polymer, comprising dissolving or dispersing an aromatic polymer into a compound containing a sulfonyl group ($-SO_2-$) as a solvent, and mixing the resulting solution or dispersion of the aromatic polymer with a sulfonating agent to perform a sulfonation reaction, wherein the solvent is at least one member selected from the group consisting of sulfolane and dimethylsulfone, and the sulfonating agent is at least one member selected from the group consisting of chlorosulfonic acid, sulfuric anhydride, sulfuric acid, and fuming sulfuric acid.

2. The method according to claim 1, wherein the aromatic polymer is at least one member selected from the group consisting of aromatic polyamides, aromatic polyimides, aromatic polyether ketones (PEKs), aromatic polyether ether ketones (PEEKs), aromatic polycarbonates, aromatic polysulfones (PSs), aromatic polysulfoxides, aromatic polysulfides, aromatic polyether sulfones (PESs), aromatic polyether ether sulfones, aromatic polyesters, and polystyrenes.

3. The method according to claim 2, wherein the aromatic polymer is an aromatic polyether sulfone (PES).

* * * * *